US012506758B2

(12) United States Patent
Neuvirth-Telem et al.

(10) Patent No.: US 12,506,758 B2
(45) Date of Patent: Dec. 23, 2025

(54) SECURITY SYSTEM

(71) Applicant: Microsoft Technology Licensing, LLC, Redmond, WA (US)

(72) Inventors: Hani Neuvirth-Telem, Tel Aviv (IL); Michal Shechter Nachmany, Hod Hasharon (IL); Yoram Cohen, Givataim (IL); Hadas Orgad, Herzliya (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 213 days.

(21) Appl. No.: 18/189,996

(22) Filed: Mar. 24, 2023

(65) Prior Publication Data

US 2024/0414178 A1  Dec. 12, 2024

(51) Int. Cl.
H04L 9/40 (2022.01)

(52) U.S. Cl.
CPC ...... H04L 63/1425 (2013.01); H04L 63/1433 (2013.01); H04L 63/1441 (2013.01)

(58) Field of Classification Search
CPC .......... H04L 63/1425; H04L 63/1433; H04L 63/1441; H04L 63/1416; G06F 21/554
See application file for complete search history.

(56) References Cited

U.S. PATENT DOCUMENTS

| | | |
|---|---|---|
| 8,898,090 B2 | 11/2014 | Kapoor et al. |
| 9,699,049 B2 | 7/2017 | Gupta et al. |
| 12,225,031 B1 * | 2/2025 | Coull ................. H04L 63/1425 |
| 2017/0093902 A1 | 3/2017 | Roundy et al. |

(Continued)

FOREIGN PATENT DOCUMENTS

| | | |
|---|---|---|
| EP | 2009604 A1 | 12/2008 |
| WO | 2021050145 A1 | 3/2021 |

OTHER PUBLICATIONS

"CISA National Cyber Incident Scoring System", Retrieved from: https://web.archive.org/web/20211231180710/https://www.cisa.gov/uscert/CISA-National-Cyber-Incident-Scoring-System, Dec. 31, 2021, 4 Pages.

(Continued)

*Primary Examiner* — Thomas A Gyorfi
(74) *Attorney, Agent, or Firm* — Shook, Hardy & Bacon L.L.P.

(57) ABSTRACT

In accordance with the methods herein, an incident description characterizing a security incident and a manually-assigned incident characterization label characterizing the same security incident are received. The manually-assigned incident characterization label corresponds to one of a plurality of incident classification categories (including, for example, true positive, false positive) assigned by a user of a security monitoring system such as a SIEM system. A trained incident classification model is applied to the incident description, to classify the security incident in relation to the incident classification categories, thus generating a model classification prediction. The model classification prediction is compared with the manually-assigned incident characterization label and where it is determined that the manually-assigned incident characterization label and the model classification prediction are mismatched, a security mitigation action associated with the security incident is performed.

20 Claims, 7 Drawing Sheets

(56) References Cited

U.S. PATENT DOCUMENTS

| | | | |
|---|---|---|---|
| 2018/0367561 | A1 | 12/2018 | Givental et al. |
| 2020/0004957 | A1 | 1/2020 | Chamaraju |
| 2021/0103580 | A1 | 4/2021 | Schierz et al. |
| 2021/0281592 | A1 | 9/2021 | Givental et al. |
| 2021/0326744 | A1* | 10/2021 | Israel .................... G06N 5/02 |
| 2021/0377303 | A1 | 12/2021 | Bui et al. |
| 2022/0012625 | A1 | 1/2022 | Ben-itzhak et al. |
| 2022/0086173 | A1* | 3/2022 | Yavo .................... H04L 63/1416 |
| 2022/0407882 | A1 | 12/2022 | Neuvirth et al. |
| 2023/0283513 | A1* | 9/2023 | Goodwin ............... G06N 3/045 709/224 |

OTHER PUBLICATIONS

"Open Neural Network Exchange", Retrieved from: https://onnx.ai/, Retrieved on: Feb. 2, 2023, 3 Pages.

"Non Final Office Action Issued in U.S. Appl. No. 17/352,008", Mailed Date: Jul. 25, 2023, 19 Pages.

Boucher, et al., "Security Incident", Retrieved from: https://learn.microsoft.com/en-us/azure/azure-monitor/reference/tables/securityincident, Feb. 1, 2023, 2 Pages.

Bressler, Noam, "How to Check the Accuracy of Your Machine Learning Model", Retrieved from: https://deepchecks.com/how-to-check-the-accuracy-of-your-machine-learning-model/, Nov. 23, 2022, 9 Pages.

Brownlee, Jason, "How to Manually Optimize Neural Network Models", Retrieved from: https://machinelearningmastery.com/manually-optimize-neural-networks/, Dec. 4, 2020, 23 Pages.

Didugu, Chetana, "IT Incident Ticket Classification with ML, DL and Language Models", Retrieved from: https://medium.com/analytics-vidhya/it-incident-ticket-classification-with-ml-dl-and-language-models-2bfc593885, Nov. 10, 2020, 19 Pages.

Kandakumar, Karthikk., "IT Support Ticket Classification using Machine Learning and ServiceNow", Retrieved from: https://medium.com/@karthikkumar_57917/it-support-ticket-classification-using-machine-learning-and-ml-model-deployment-ba694c01e416, Mar. 16, 2019, 22 Pages.

Kharwal, Aman, "Classification Model Evaluation in Machine Learning", Retrieved from: https://thecleverprogrammer.com/2022/08/09/classification-model-evaluation-in-machine-learning/, Aug. 9, 2022, 8 Pages.

"International Search Report and Written Opinion Issued in PCT Application No. PCT/US22/029934", Mailed Date: Sep. 15, 2022, 10 Pages.

Saravanan, Jeeva, "How to Evaluate your Machine Learning Model", Retrieved from: https://medium.com/analytics-vidhya/how-to-evaluate-your-machine-learning-model-76a7671e9f2e, May 29, 2021, 27 Pages.

Vallim, et al., "ONNX Models", Retrieved from: https://learn.microsoft.com/en-us/windows/ai/windows-ml/get-onnx-model, Dec. 30, 2021, 2 Pages.

Wangen, Gauteb., "Quantifying and Analyzing Information Security Risk from Incident Data", in Proceedings of the Sixth International Workshop on Graphical Models for Security, Jul. 2019, 26 Pages.

Communication under Rule 71(3) received in European Application No. 22730650.3, mailed on Sep. 30, 2024, 7 pages.

International Search Report and Written Opinion received for PCT Application No. PCT/US2024/019626, Jun. 19, 2024, 12 pages.

Notice of Allowance mailed on Jan. 26, 2024, in U.S. Appl. No. 17/352,008, 13 pages.

Decision to grant a European patent pursuant to Article 97(1) received in European Application No. 22730650.3, mailed on Jan. 23, 2025, 2 pages.

International Preliminary Report on Patentability (Chapter I) received for PCT Application No. PCT/US2024/019626, Oct. 9, 2025, 06 pages.

* cited by examiner

SECURITY SYSTEM

BACKGROUND

Computer networks are used in various organizations, including businesses, universities, governmental organizations, etc. Network security is vital for keeping an organization running properly. Without such security, an organization's various computing systems and other network resources may be exposed to malicious programs. Such programs could access sensitive data, hold data and resources for ransom, or perform other damaging acts.

Security of such networks can be managed by a security operations center (SOC) which monitors and assesses activity on these networks for possible attacks or other security incidents.

SOCs typically use a security information and event management (SIEM) system to aggregate and correlate data from applications, systems and network hardware of the computer network. SOCs employ analysts who monitor security alerts collected by the SOC from various sources on the computer network, review the alerts to determine if a genuine threat is present, and take action to mitigate potential threats.

SUMMARY

The present disclosure relates to the classification of security incidents generated for an enterprise computer network or other monitored computer system. In accordance with the methods described herein, an incident description characterizing a security incident and a manually-assigned incident characterization label characterizing the same security incident are received. The manually-assigned incident characterization label corresponds to one of a plurality of incident classification categories (including, for example, true positive, false positive) assigned by a user of a security monitoring system such as a SIEM system. A trained incident classification model is applied to the incident description, to classify the security incident in relation to the incident classification categories, thus generating a model classification prediction. The model classification prediction is compared with the manually-assigned incident characterization label and where it is determined that the manually-assigned incident characterization label and the model classification prediction are mismatched, a security mitigation action associated with the security incident is performed. The security mitigation action could be, for example, generating a mismatch alert which could be used to notify a user of a mismatch between the manually-assigned label and the model's prediction. This method helps to improve the quality of manually-assigned labels for security incidents by identifying potential errors in labels assigned manually.

The generation of the mismatch alert may cause a warning to be output to a user via a user interface. In response to the warning, the user may update the manually-assigned incident characterization label, with the updated manually-assigned incident characterization being received for that security incident via the user interface. This allows the accuracy of the labels assigned by the user to be improved as the model flags apparent contradictions between the user's assigned label and their comment characterizing the security incident. The updated manually-assigned incident characterization labels may be stored to memory for training an incident detection model or threat remediation model. The improved accuracy of the data provides high-quality training data for training incident detection models and/or threat remediation models to handle security incidents.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
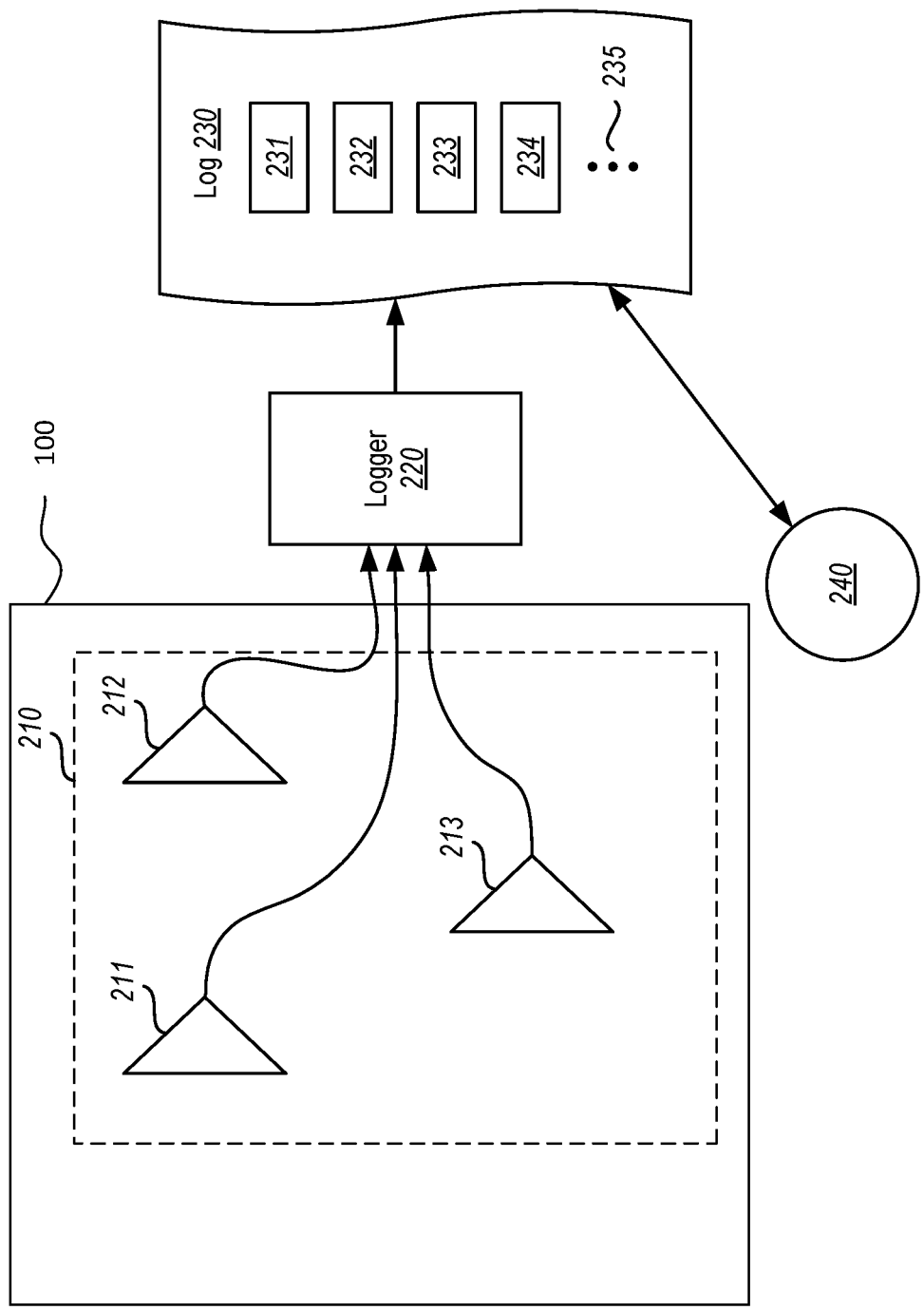
FIG. 1 is a schematic block diagram showing the monitoring of a computer network by a security operations center.

Computer networks typically include a number of security systems to monitor activity on the network and raise alerts when anomalous or potentially threatening activity is detected. However, a problem with many such systems is over-reporting of security alerts, where in most cases the underlying cause is benign and no real threat is present. To identify which security alerts need further action, security operations centers typically employ human analysts to review the alerts and determine if they represent a true security threat.

The methods described herein relate to a security system in which security incidents relating to a computer network are raised to users of the security system, for the users to manually assign incident characterization labels which classify the security incident into a security incident threat classification (such as true positive, benign positive, and false positive, described in more detail later).

Users also provide incident descriptions that include comments summarizing their assessment of the security incident or providing further context. These comments are generally provided as text inputs, but other types of language inputs could be used, such as speech inputs. However, manual classifications are prone to error. These errors may be discovered by manual review of the text comments, for example, where the user has classified an incident as a true positive, while the comment includes a contradictory statement, for example 'benign activity'. For security systems, it is important to identify and distinguish 'true' security incidents in which the network or computer system was actually compromised, from benign events.

An aim of the methods described herein is to automatically identify errors in manually-assigned incident characterization labels, to identify true security incidents more effectively, and to identify users or groups of users that provide inconsistent data in relation to security incidents in order to improve the quality of security incident classification data for use in downstream tasks. A classification model is trained and used to classify text comments from users, generating a predicted security incident threat classification which can then be compared with the manually-assigned incident characterization labels, and a mismatch can then be flagged and output to the user. A distinction is drawn between a training input/output used to train a mode and a runtime input/output (processed or obtained 'at runtime' using a model that has been trained).

When a mismatch is identified between the manually-assigned label provided by a user for a given security incident and the predicted security incident threat classification generated by the model, a number of security mitigation actions can be taken based on the determined mismatch. First, a mismatch alert could be generated, which can be notified to the user, for example via a user interface, where the user can update the manually-assigned label if the original label was an error. This provides more accurate classification labels for security incidents, which allows true security threats to be identified more effectively and which provides high-quality labels for training models for automatically detecting, classifying and remediating threats based on security incident data. The mismatch alert may alternatively be stored to memory, such that the security incidents for which a mismatch was identified can be analyzed, ensuring that security incidents that, for example, the user incorrectly identified as false positives, but were actually true positives, are flagged and analyzed such that true security threats are not missed in later analysis.

A second possible security mitigation action that may be taken once a mismatch is identified is to perform an automatic threat mitigation action. For example, where the user determines that a given security incident is a false positive, but the trained classification model determines that it is a true positive, an action may automatically be taken to automatically handle the threat associated with that security incident, for example by taking action to identify and isolate resources on the computer network which are potentially compromised due to the security incident or by monitoring or otherwise taking action to prevent any threatening behavior from user accounts associated with the security incident, for example by blocking user accounts or computer software associated with a security incident for which a prediction of true positive is generated by the classification model to limit the effect of the security threat on the computer network.

Another possible security mitigation action is to determine a priority value associated with the security incident based on the identified mismatch. For example, where the manually-assigned incident characterization label is 'benign positive' but the model prediction is 'true positive', the given security incident may be assigned a higher priority value so that it is handled earlier than a security incident labelled by both the user and the model as 'benign positive'. As another example, a security incident having a manually-assigned label of 'true positive' but for which the model made a prediction of 'benign positive' may be deprioritized, such that the security incidents which are labelled by both the model and the user as 'true positive', for which there is a high probability of a real underlying threat, are handled before security incidents where the model prediction does not support a manually-assigned 'true positive' label.

Incident characterization labels, such as threat classification labels, provided by security analysts may also be used to train models (e.g. machine learning models) to automatically classify security incident alerts. For such a model to be accurate, the training data needs to be of high quality, so it is important to have manually-assigned incident characterization labels that are accurate.

It should be noted that references to 'users' herein include analysts or other users of a security operations center or similar monitoring tool, who monitor raised security alerts and assess security risk associated with incidents. These users are typically IT or security specialists and are typically not the end users of applications of the network or computer system for which the security alerts are generated.

FIG. 1 shows a schematic block diagram of a computer network 100 monitored by a security operations center 240. The computer network 100 may belong to an organization, such as a business, university, government, etc. The computer network 100 includes sensors 210 that detect security incidents. A logger 220 reports respective security incident alerts to a log 230, which is processed by a security operations center 240. The sensors 210 are illustrated as including three sensors 211, 212 and 213. However, the computer network 100 can include any number of sensors that can detect potential security incidents. The sensors 210 may be distributed throughout the computer network in order to detect security incidents by locale. Alternatively, or in addition, the sensors 210 may specialize in detecting particular types of security incidents. A sensor could be any tool or application in the computer network that generates or collects data relevant for security.

The potential security incidents detected by the sensors 211, 212 and 213 are reported into the log 230 via, for example, a logger component 220. Although shown as separate from the computer network 100, the logger component 220 can be implemented as part of the computer network 100 or as a separate component. Similarly, the log 230 may be held within the computer system or in a separate system. The log 230 shown includes four security incident alerts 231-234. However, there may be any number of security incident alerts within the log 230. Over time, new security incident alerts will be added to the log 230 and potentially stale security incident alerts may be deleted from the log 230.

The security operations center 240 monitors the log 230 by reading security incident alerts and making those alerts visible to a further computer application or a human analyst for processing. The further application or analyst can then evaluate whether the security incident alert reflects a real security incident, whether that security incident is significant, and what remedy (if any) should be taken in order to neutralize or ameliorate the effect of this or similar security incidents. In an example, one or more Information Technology (IT) representatives of the organization to which the computer network 100 belongs could staff the security operations center 240. In another example, the SOC 240 could be provided by a third-party organization, and analysts of the third-party organization could staff the SOC 240. In this case, a single SOC may be used to separately monitor multiple computer networks 100 belonging to different organizations.

The human analysts of an SOC typically label security incidents according to their assessment of the threat posed by that security incident. In one example, the analyst classifies each security incident into one of 'true positive', 'false positive' or 'benign positive'. 'True positive' is used to denote a security incident for which a real underlying security threat exists. 'False positive' is used to denote a security incident for which no underlying security threat exists, i.e. situations in which no notification is required. 'Benign positive' is a third category used for cases where the security incident corresponds to potentially suspicious underlying activity that should be notified to a user of the SOC, but for which no action is required. An example of a benign positive security incident is where a program that is identified as possibly malicious has been run somewhere on the computer network, but by a security analyst running security tests. In this case, the security incident should be raised, since it cannot be easily distinguished from a genuine attempt to run a malicious program, but a security analyst can determine that this does not represent a real threat to the computer system.

The SOC 240, logger 220 and log 230 may be implemented internal to the organization's computer network 100, or external to the organization, for example via a cloud service. When implemented internally to the organization, all or some of the functionality of the SOC 240 may be implemented within a cloud computing environment. As mentioned above, where the SOC is implemented outside of an organization's computer system, it may be used with multiple computer systems belonging to a single organization, or multiple computer systems belonging to different organizations.

Figure 2:
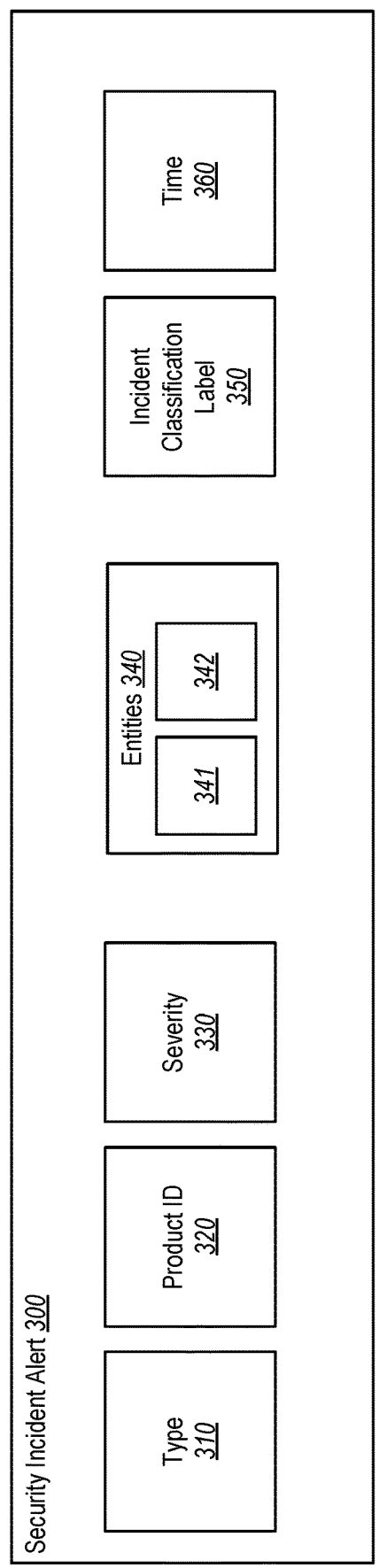
FIG. 2 is a schematic block diagram showing an example security incident alert data structure.

FIG. 2 schematically illustrates a security incident alert data structure 300. The security incident alert data structure 300 is an example of how each of the security incident alerts 231 through 234 of the log 230 in FIG. 1 may be structured. The security incident alert data structure 300 includes various fields that represent features of the security incident alert 300. For instance, the security incident alert data structure 300 includes an incident type 310, a product identifier 320, a severity level 330, related entities 340, an alert threat classification 350, a time 360, amongst potentially other features as represented by the ellipsis 370.

The alert type 310 represents an incident type. As an example only, the alert type 310 might be unusual behavior from privileged user accounts, unauthorized insiders trying to access servers and data, anomalous outbound network traffic, traffic sent to or from unknown locations, excessive consumption of resources, unapproved changes in configuration, hidden files, abnormal browsing activity, suspicious registry entries and so forth. The product identifier 320 identifies the product that generated the alert. The severity level 330 indicates an estimated severity of the security incident (e.g., severe, moderate, minor).

The related entities 340 includes any organizational assets that relate to the security incident. Assets include machines, users, files and resources of the network. As an example, if the security incident occurred due to a user using a machine to access a resource, then that user, machine and resource may be identified as related entities of the security incident. In FIG. 2, the entities field 340 includes entity field 341 and entity field 342. However, there may be any number of entities identified as being related to the security incident.

The threat classification field 350 identifies an estimated threat classification of the security incident alert. As an example, the threat classification could be expressed as a "true positive" if the underlying security incident is estimated to be real, a "false positive" if the alert is estimated to not really reflect an actual security incident, or perhaps "benign positive" if the alert is based on a real security incident that occurred as a result of controlled testing of the protective measures within the organization. As an example, skilled agents of the security operations center 240 could assign threat classification labels to the security incidents.

The threat classification data could also include a likelihood indicator that can be expressed qualitatively (e.g., "highly likely", "moderately likely", and so forth) or quantitatively by percentage for example. As an example, a particular security incident alert might be given a 90 percent chance of being a true positive.

The security incident alert data structure 300 also includes a time 360 at which the security incident took place, the time that the security incident alert was created and/or the time that the security incident alert was recorded in the log 230. The security incident alert data structure could further include any number, type, and variety of fields representing features of the security incident alert.

Figure 3:
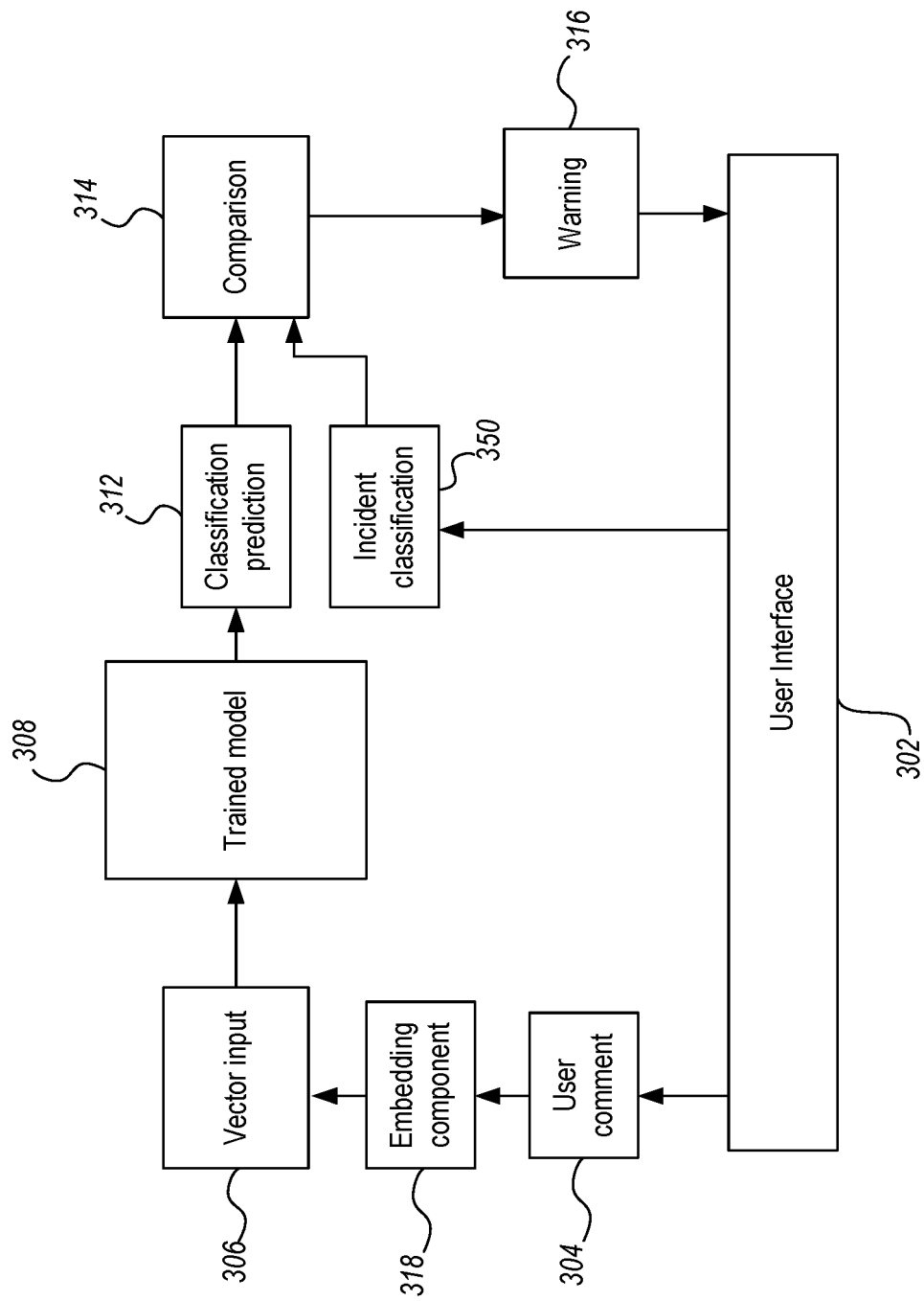
FIG. 3 is a schematic block diagram showing a computer system for investigating security incidents.

As mentioned above, when reviewing a security incident alert such as that shown in FIG. 3, an analyst assigns an incident classification category such as 'true positive', 'false positive' or 'benign positive' to the security incident, according to the threat that they perceive to be associated with that security incident. At the time of assigning the incident classification 350, the user may also add a user comment giving reasoning for the assigned incident classification. A further field of the security alert 300 may be provided for such comments. The user comment may be a 'free-form' (unstructured) natural language description of the security incident, such as a text description entered by the user or transcribed from a voice input, or a voice input recorded by the user. Alternatively, or in addition, the user comment may comprise structured or semi-structured description data, such as a plurality of values (e.g. text strings, or selections of predefined description items) assigned to a plurality of predefined description fields by the user (e.g. by the user completing a predefined form or template).

In general, it is expected that user comments correspond to the incident classification category assigned to the security incident alert. However, due to a misapplication of the definitions of each category or other human error, inconsistencies can occur, for example where a user marks a security incident alert as 'true positive', but the corresponding comment includes a reference to 'benign activity', indicating that the correct incident classification was 'benign positive'. It is important that manually-assigned incident characterization labels are correct, since these labels may be used to determine an action to be taken to mitigate security risks in the network, as well as being used to prioritize security incidents to be addressed.

For example, security incidents marked as 'true positive' might be processed first, and any action relating to these incidents would be taken before handling those marked as 'benign positive' or 'false positive'. Incorrectly identifying a security incident as true positive can therefore cause a delay in processing real security incidents on the network. Incident classification labels provided by security analysts may also be used to train models (e.g. machine learning models) to automatically assign an incident classification label to a security incident alert (for example based on other data of the security incident alert, such as the alert type, time, entities, etc.). For such a model to be accurate, the training data needs to be of high quality, so it is important to have manually-assigned incident characterization labels that are accurate.

A system for automatically detecting inconsistencies between user comments and incident classifications assigned by the user and warning the user when an inconsistency is found will now be described.

FIG. 2 shows a schematic block diagram of a method for identifying inconsistencies between user comments and incident classifications assigned to security incident alerts in a computer network. The user (as described above, typically a security analyst) typically reviews the security incidents and provides comments and incident classifications via a user interface 302 of the SOC 240 or other security monitoring tool. The user comment 304, as described above, typically provides context and/or further information on the security incident alert and the reasons for selecting the given incident classification 350, and takes the form of a text string.

The user comment is processed by an embedding component 318 to generate a vector input 306. The embedding component may be a neural network that is trained to generate a representation of the given input in a vector space that captures semantic information of the text. Examples of such neural network based text embedding models include word2vec and SBERT. Various suitable word and sentence embedding techniques are known in the art, and they will not be discussed further herein.

The vector input 306 is provided to a machine learning model 308 which has been trained to determine, based on a vector input 306 representing a user comment 304 characterizing a security incident, a corresponding incident classification label 350. As described above, the trained model may be trained based on an existing training set of user comments and corresponding manually-assigned incident characterization labels. As noted above, manually-assigned incident characterization labels may contain individual errors. However, when used to train such a model, an underlying assumption is that, overall, the manually-assigned incident characterization labels are accurate enough, and errors are isolated enough, that the user data can train a sufficiently good model to predict incident characterization labels, such as incident classification scores. In this context, a prediction may be deterministic or probabilistic. A probabilistic prediction assigns predicted scores to classes that are representative of class probabilities. These classification scores may or may not be normalized.

The model 308 may be a neural network, comprising multiple layers of nodes, with learned weights applied to the inputs to each node, and a non-linear function applied to the weighted inputs. The neural network may be 'fully connected' in that each node of a given layer is 'connected' to each node of the subsequent layer (i.e. the output of each node of a given layer is provided as a weighted input to each node in the subsequent layer). A final layer of the model is configured to generate a classification for the input vector 306 (that is, to generate a classification label corresponding to the user comment 304). This may be implemented as a softmax layer to compute a probability for each of the possible incident classification categories. Neural networks are well-known in the art and will not be described in detail herein. Alternatively, other known machine learning classifiers may be used.

In the present example, there are three possible incident classification categories associated with the security incident alert: 'true positive' (TP), 'false positive' (FP) and 'benign positive' (BP). However, other incident classification categories may be defined. Therefore, the final layer of the neural network model 308 is configured to output a probability vector comprising three probability values, each associated with a different respective incident classification category. Alternatively, the model may be configured to output a single incident classification category as the predicted classification category associated with the user comment 304.

The output of the trained model 308 is a classification prediction 312, in the form of a predicted incident classification category, or a set of probability values associated with each incident classification category. This classification prediction 312 is then compared in comparison 314 with the incident classification 350 provided by the user and associated with the user comment 304. The comparison 314 comprises determining whether there is a mismatch between the incident classification 350 provided by the user and the classification prediction 312 provided by the model 308. A mismatch may be defined in different ways. In the case that the classification prediction 312 is in the form of a incident classification category, the comparison 314 merely comprises checking that the predicted classification category 312 and the manually-assigned incident characterization category are the same, and if not, raise a warning 316.

In the case that the classification prediction 312 is a vector of probability values corresponding to each of the possible incident classification categories, a mismatch may instead be defined by the probability of the incident classification category corresponding to the incident classification 350 assigned by the user, according to the classification prediction 312, being below some defined threshold probability, or the probability of a different threshold classification category being above some defined threshold. For example, where the classification prediction 312 is a vector [0.01, 0.08,0.91], corresponding to [TP,FP,BP], and the incident classification 350 assigned by the user was 'true positive', the probability of the incident classification category chosen by the user according to the model classification prediction 312 is 0.01. In this case, the model considers it highly unlikely that the given user comment relates to a true positive security incident, though the user did choose that classification. If the threshold probability is set, for example, at 0.2, then the probability of the manually-assigned incident characterization category falls below this threshold and it is determined that a mismatch occurred. Alternatively, a minimum threshold of 0.8 applied to the BP category would also indicate a mismatch.

A threshold probability for mismatch may be defined based on various factors. A different threshold probability is defined for each possible pair in the comparison. For example, where the manually-assigned incident characterization is BP, the threshold probability applied to TP may be relatively low. This is because even if the model does not consider true positive to be highly probable, if it is even somewhat probable according to the model classification, it would be risky to ignore that security alert, since the consequences of ignoring a real security incident are potentially severe, while the consequences of incorrectly raising a benign security incident alert as a true positive are relatively minor, since a human analyst will manually investigate and determine that no incident exists. For the same reason, for the inverse case, where the manually-assigned incident characterization is 'true positive', the maximum threshold applied to 'benign positive' above which is a mismatch may be relatively high, since it is more serious to incorrectly raise a benign positive but miss a true positive than to incorrectly raise a true positive and miss a benign positive. In other words, because true positives are the most important category to identify, the thresholds for each possible pair of categories to be compared are defined so as to be more sensitive to true positive classifications.

In the present example, thresholds are determined for each pair of incident classification categories as follows. A certain rate of mismatch alerts is decided on, e.g. on at most 10% of the incidents. This could be determined based on an analysis of errors in existing data, for example by manually analyzing comments and corresponding manually-assigned incident characterization and determining what proportion of the incidents are misclassified. The mismatch alert rate is divided between all the possible options, giving higher weight to true positives, since they correspond to true attacks, and are rare. This could result in a threshold of, for example, 70% (0.7) probability associated with a model prediction of a given comment being false positive for a corresponding manually-assigned incident characterization of true positive to be considered a mismatch, while a probability of 99% (0.99) may be required for a prediction of 'false positive' to be considered a mismatch against a manually-assigned incident characterization of 'benign positive'.

According to the above example, if the user assigned a true positive classification, but the prediction gives a 70% probability that it's a false positive, an alert is raised, but for a manually-assigned incident characterization label of benign positive vs a predicted classification of false positive, which is deemed less important, since neither false positive nor benign positive is treated as a genuine threat, a different threshold probability of 99% is chosen that would result in fewer warnings (i.e. only if the customer classifies as benign positive and the model predicts false positive with 99% then a warning is raised). A threshold for each such pair of (manually-assigned incident characterization; model prediction), that altogether results in an average rate of warnings of, say, 10%. According to this example method of defining a threshold, this could result in different rates of mismatch for each incident class, such that the relative importance of different types of misclassifications is considered along with their relative frequencies, while still maintaining an overall warning rate (i.e. rate of incidents for which a mismatch alert is generated) of 10%.

When a mismatch is identified, a warning is output to the user interface 302. The user may decide to update the incident classification 350 based on the warning, if the user determines that the mismatch is due to an error in the incident classification. Otherwise, no action is taken and the user incident classification 350 remains the same. Instead of outputting the warning directly to the user interface, the warnings may instead be stored to computer memory for later analysis. This data may be used for example to monitor the model over time, as described in more detail below.

The SOC may monitor how many warnings are raised, and how often the warnings lead to a change in the manually-assigned incident characterization label over time. An expected overall warning rate is about 10% of all security incidents analyzed by the model. If the rate deviates significantly from this expected rate over time, this could indicate a change in either the performance of the model or the quality of the user data (classification and comment pairs). Similarly, a change over time in how often the raised warnings lead to a change in the user incident classification 350 may indicate that the model is performing poorly on new data.

The above-described method is implemented by a computer system used as part of a security monitoring entity such as a SOC. As mentioned above, a security analyst user interacts with a security monitoring application via the user interface 302. The security monitoring application that implements the above-described method to determine mismatches between manually-assigned incident characterization and user comments may be provided via a cloud service. The method above can be implemented in real time, such that, when a user selects a incident classification category 350 for a given security incident alert 300 via the user interface, the model is loaded, for example from a code repository, to memory of the computer system on which the security monitoring application is implemented, and the model is applied in real time to the user input as the user writes the comment.

It should be noted that the user interface 302 is not necessarily implemented as part of the same physical computer system as the model 308. For example, where the trained model is provided as part of a security monitoring application provided via a cloud platform, the user would interact with the model via a user interface of a device of the user, such as a desktop computer, etc., while the model is run on a computer system provided by the cloud platform, with the user device communicating with the computer system via the internet.

The model 308 processes a partial user comment as the user continues to write the comment, and generates predictions per incident classification category based on the partial input, outputting a warning if the model predictions for the different classes differ from the manually-assigned incident characterization based on that partial user comment.

Alternatively, the user comment may be provided to the model only once the user has submitted a full comment via the user interface, and the full comment is processed according to the method described above to generate a predicted incident classification to be compared with the manually-assigned incident characterization.

Figure 4:
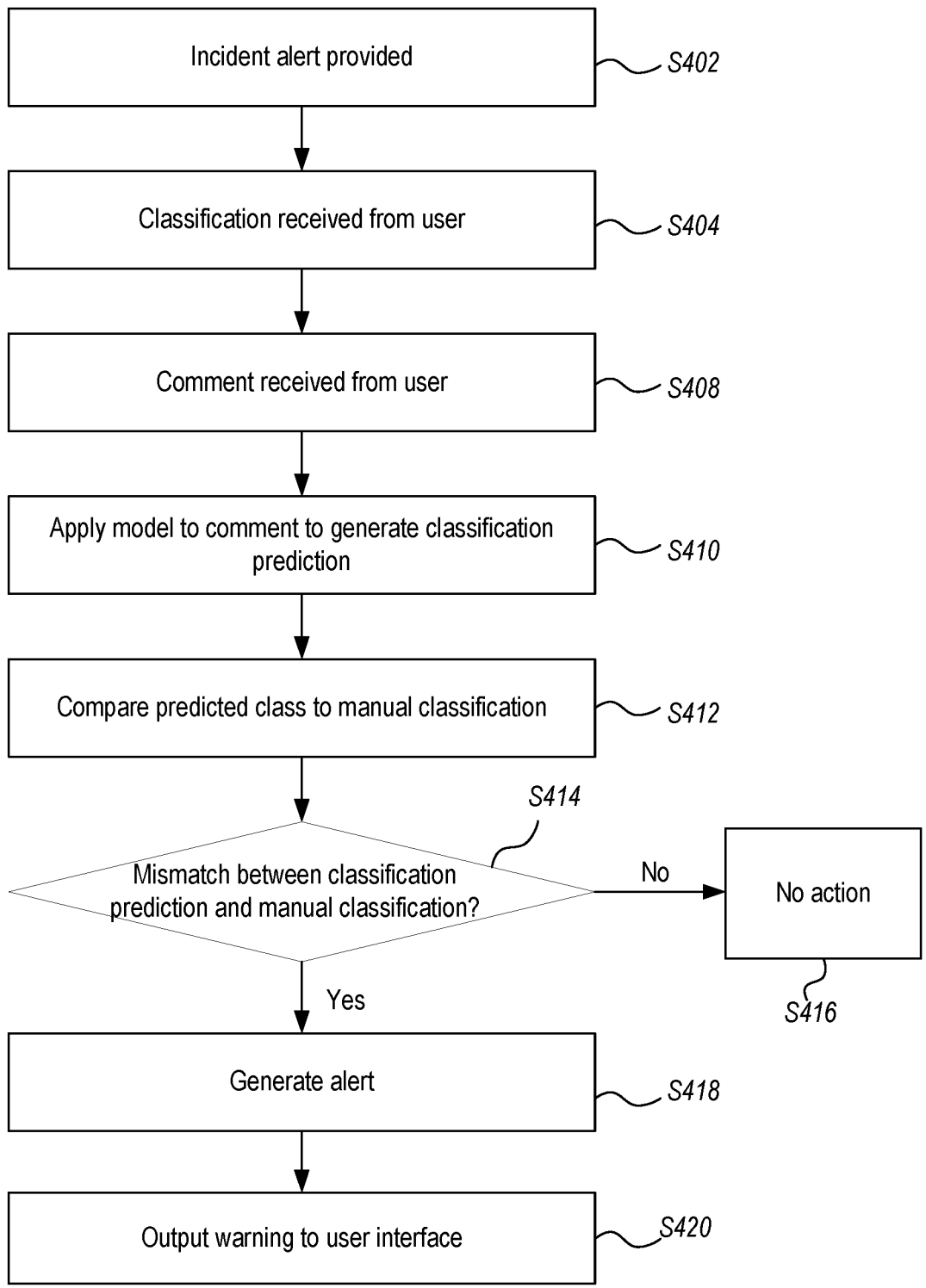
FIG. 4 is a flow diagram showing a method of investigating security incidents.

FIG. 4 is a flow diagram showing the steps of a method for investigating the accuracy of manually-assigned incident characterization for security incidents. At step S402, a security incident is raised to the user via the user interface 302. As described above with reference to FIG. 1, the security incident alerts can be read by the SOC 240 from a log 230 to which sensors on the computer network(s) report. These may be displayed to an analyst user via a user interface, for example providing a list of security incident alerts on a graphical user interface displayed on a computer monitor of the user.

At step S404, a classification is received from the user for the security incident alert. The user interface may provide a dropdown menu for the security incident alert, or a similar function for the user to select one of the possible incident classification categories, e.g. FP, TP, BP. The model is loaded to memory in advance of processing the incident alerts, being held in memory until the user comment has been received via the user interface, before running it on the user comment.

At step S408, a comment is received by the computer system of the SOC 240 from the user via the user interface, describing the security incident alert and providing further context for the incident classification chosen by the user. As described above, the model can be applied as the user continues to add text to the comment, so a partial or a full comment may be received at this step. The model may be running more than once, as the user writes the comment in real time, for example running the model on the latest version of the user comment at each point at which the user pauses while entering the comment. The user interface 302 may provide a text box or similar functionality to enable the user to provide natural language input, for example via a keyboard of the computer system.

At step S410, the trained classification model 308 is applied to the comment to generate a classification prediction 312, which, as described above, may be a vector of probability values corresponding to the different incident classification categories. At step S412, this vector of probability values is provided to a comparison module 314 to compare the classification prediction to the manually-assigned incident characterization label. As described above, this involves checking whether the probability of each incident classification category meets a threshold probability indicating a mismatch, where the threshold depends on both incident classification categories of the comparison. For example, where the manually-assigned incident characterization label is BP, the threshold probability can be different for each of the TP and FP classes, and similarly the threshold TP probability when the manually-assigned incident characterization label is BP can be different from the threshold TP probability when the manually-assigned incident characterization label is FP.

A check is performed by the comparison module 314 at step A414 as to whether a mismatch exists between the model classification prediction and the manually-assigned incident characterization label, where a mismatch is triggered by at least one classification prediction probability for a category not matching the manually-assigned incident characterization label being above a defined threshold. If no mismatch exists, no action is taken in relation to the security incident alert (S416). In this case, the security incident alert is treated according to the manually-assigned incident characterization label originally assigned to it by the user.

If a mismatch does occur between the model prediction and the manually-assigned incident characterization label, a mismatch alert is generated (S418) to indicate that a mismatch has occurred. A warning is displayed to the user via the user interface S420, for example as a text pop-up or other visual element of the user interface notifying the user that a mismatch has been found between the manually-assigned incident characterization label provided by the user and the model's prediction based on the user's comment. As noted above, instead of displaying the warning directly in the user interface, the warning may instead be stored to a database for later analysis. The user may review the warnings at a later stage by accessing the database, and choose to update some or all of the manually-assigned incident characterization labels in response. The stored warnings may also be used to monitor the performance of the model over time, as described in more detail below with reference to FIG. 6.

Figure 5:
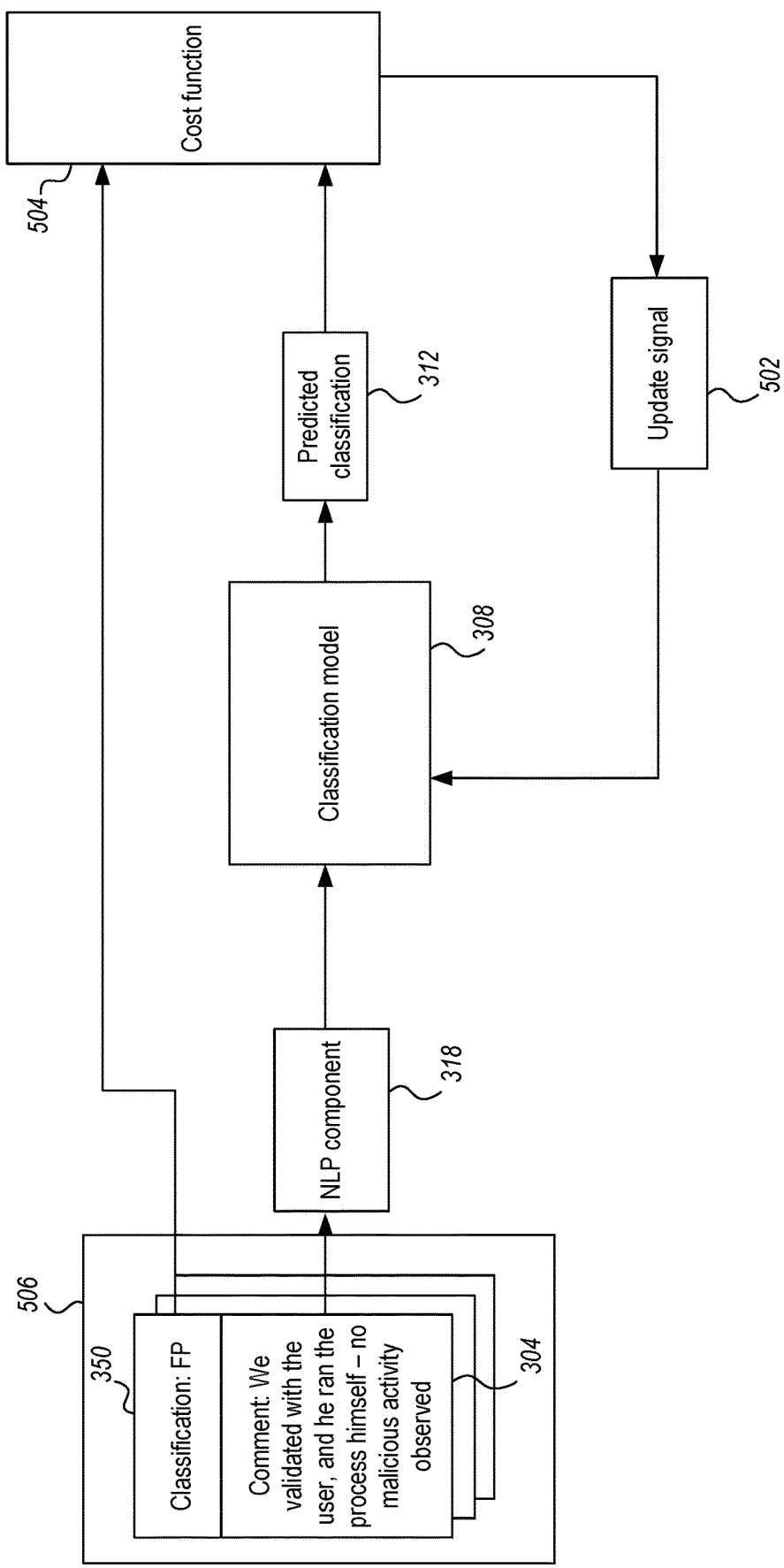
FIG. 5 is a schematic flow diagram of a training method for a security incident classification model.

FIG. 5 shows a schematic block diagram of a training method for training the model 308 to perform incident classification based on user comments.

The training data 506 comprises multiple security incident alerts, each of which has an associated manually-assigned incident characterization label 350 and a user comment 304. The training data 506 is typically historical data received by the security operations center 240, for example a set of security incident alerts received over a month. This may be stored in a database or other data store of the security operations center 240. The training data could comprise security incident alerts from multiple sources (i.e. multiple computer networks belonging to different organizations that report alerts to the SOC 240). A pre-processing step may be applied to filter the training data, for example to remove words or terms that are unique to specific organizations, to avoid compromising privacy.

The user comment 304 is extracted from each security incident alert of the training data 506. The security incident alert is a structured data object comprising multiple fields as described above with reference to FIG. 2. The user comment can therefore be extracted from a 'user comment' field of the security incident alert. The user comment is received in the form of text, which can be converted to a vector format by the embedding component 318, as described above. In the present example, the embedding component 318 is a pre-trained word embedding model (such as word2vec or SBERT or GPT), and the parameters of the embedding component 318 are not adjusted during the training process shown in FIG. 5. However, in other example implementations, an embedding component 318 may be trained 'end-to-end' alongside the classification model 318, with the parameters of both the classification model 308 and the embedding component being updated during training to improve the classifications of the model. Alternatively, the embedding component could perform a simpler conversion of the input into a vector-based representation, for example by representing each input word by its frequency or some other numerical characteristic (this is also referred to herein as bag-of-words representation). This does not require any pre-trained model.

The output of the embedding component 318 is a vector representation of the user comment 304. The vector representation captures semantic features of the input, for example by representing semantically similar words or sentences such that they are close together in vector space. Different types of vector representations may be used to represent a given language input in the form of a user comment. In some example implementations, the user comment may be embedded at the word level, resulting in a different numerical vector representing each word of the user comment. In other example implementations, the user comment may be embedded as a full sentence, with a single numerical vector representing the full user comment. Model architectures for implementing both word and sentence embeddings are well-known in the art and will not be described in detail herein.

The classification model 308 is a multi-layer neural network comprising weights or parameters defining the connections between 'neurons' of consecutive layers. The neural network is configured to receive the vector input representing the user comment. As described above, this may be either a single vector representing the user comment in full, or a sequence of multiple vector inputs representing The parameters of the neural network are initialized, for example randomly. The vector input is processed at each neuron of first layer of the neural network by multiplying each element of the vector by a respective weight and applying a non-linear function (activation function) to the weighted elements to generate an activation (output) of that neuron. For a fully-connected layer, each neuron of a given layer has its own respective set of weighted connections to elements of the previous layer, and its own set of weighted connections to different elements (nodes) of the next layer. Neural networks can have different numbers of neurons at each layer. This process continues with the outputs of each layer being provided as inputs to the next layer. A final layer of the neural network contains a number of nodes corresponding the number of classes into which the comments should be classified. In the present example, the final layer includes a node for each of true positive, false positive and benign positive, and the network outputs a vector of three numerical values corresponding to each of these classes. In order to represent these values in the form of a probability, a softmax function may be applied to the output of the final neural network layer. The above describes one possible implementation of a neural network for classification, but it will be understood that various alternatives and modifications to this example may be implemented.

In order to train the classification model 308, a gradient-based method, such as stochastic gradient descent is used. The output of the model 308 is a probability value associated with each possible class that the user comment belongs to that class. In the training data, an actual manually-assigned incident characterization label 350 is associated with each user comment. The goal of training is to learn a model whose predicted classifications are close to the actual classifications assigned by the users. While users can occasionally produce errors, an underlying assumption of training in this way is that these errors are rare enough that a model based on manually-assigned incident characterization labels is still broadly accurate. Gradient-based methods, such as gradient descent, use a cost function that provides some measure of error or difference between the predictions of the model and the 'target' or 'ground truth' outputs of the training data, which in the present example are manually-assigned incident characterization labels. Update signals for the weights of the model can then be determined by taking the negative gradient of the cost function with respect to the weights, i.e., by updating the weights in the direction in which the cost function decreases the fastest, thereby encouraging the model to make predictions that minimize the cost function (i.e. predictions that are close to the manually-assigned incident characterization labels).

As shown in FIG. 5, the cost function 504 receives the classification prediction 312 from the model 308, as well as the manually-assigned incident characterization label 350. As mentioned above, the classification prediction is typically a probability distribution (i.e. vector of probability values) over the possible incident classifications. In this case, a typical cost function 504 is negative log likelihood, which is computed based on the probability of the 'target' manually-assigned incident characterization labels 350 of the training data according to the probability distribution computed by the model. A goal of training is to maximize the likelihood of the model parameters based on the training data, and therefore the negative log likelihood is typically used as a cost function to be minimized (where maximizing the (log) likelihood is equivalent to minimizing the negative (log) likelihood). This cost function may also be referred to as cross-entropy loss. However, other suitable cost functions may be defined.

A gradient of the cost function is computed and an update signal 502 is determined, based on the negative gradient of the cost function with respect to the weights of the model 308. This update signal is provided to the model and the weights of the model 308 are updated accordingly. This process is repeated over multiple training iterations, with the model parameters being updated over time to learn to predict accurate classifications based on the training data. Training could continue for a predefined number of training iterations, or until some criteria of convergence of the model weights is met. Neural network training techniques are well known in the art, and will not be described in detail herein. At the end of training, the weights of the classification model 308 are fixed, and the model can be applied as described above with reference to FIG. 3.

The training process described above may also include optimizing the thresholds applied to the model predictions to determine whether to raise a warning. The thresholds are determined based on a desired overall warning rate (for example 10% of user comments receiving warnings on average), and sensitivity of the given incident categories, for example where the warnings should be more sensitive to misclassifications of true positives than those of benign or false positives. As described above, the thresholds for each pair of incident classes are determined based on the relative importance of each class and the relative frequency of each class. This can be done by sorting the predictions generated by the model for each class and determining the class probability corresponding to the desired percentile for that class. As mentioned above, the percentile does not need to be the same for each class, as long as the overall number of mismatches according to the defined thresholds matches the desired overall warning rate.

Alternatively, the threshold may be determined by applying the model to a subset of recent security incident alerts, which is separate from the training data 506, and tuning the thresholds for each pair of categories to be compared, until the desired warning level and relative sensitivities are reached.

The outputs of training are a trained incident classification model 308 having fixed weights (parameters), and a set of thresholds to be applied for raising warnings to the user in the event of a mismatch.

As the model is applied to security incident alerts that are received by the SOC 240 over time, there is a risk that the model's performance starts to degrade due to changes to the data (i.e. user comments and classifications) over time. This can happen for various reasons, for example, if different sources of security incident reports are added to the system over time, or due to changes in the computer networks being monitored or the users making the comments and classifications. In particular, user comments and classifications are expected to improve over time, in particular in response to the warnings issued by the model. Therefore, as time goes on, the model, which was trained on user data with a certain level of error, may perform worse on user comments and classifications that have improved in accuracy. For this reason, the classification model 308 is monitored over time as it is applied to new data and evaluated according to various metrics. If it is determined that the model is performing worse on new data, the outputs may be reviewed to determine whether the model needs to be retrained to learn better predictions for the new data, or whether the data itself is low quality, for example if a new source of security incident alerts has been introduced having high error rates in manually-assigned incident characterization labels. If the problem is that the new data contains inaccurate manually-assigned incident characterization labels, data from the organization or computer network having inaccurate manually-assigned incident characterization labels may be excluded from analysis by the model 308. If a review of the data shows that the model is less accurate on new data, it may be retrained on a more recent dataset to better align the model with the current manually-assigned incident characterization labels and comments.

Figure 6:
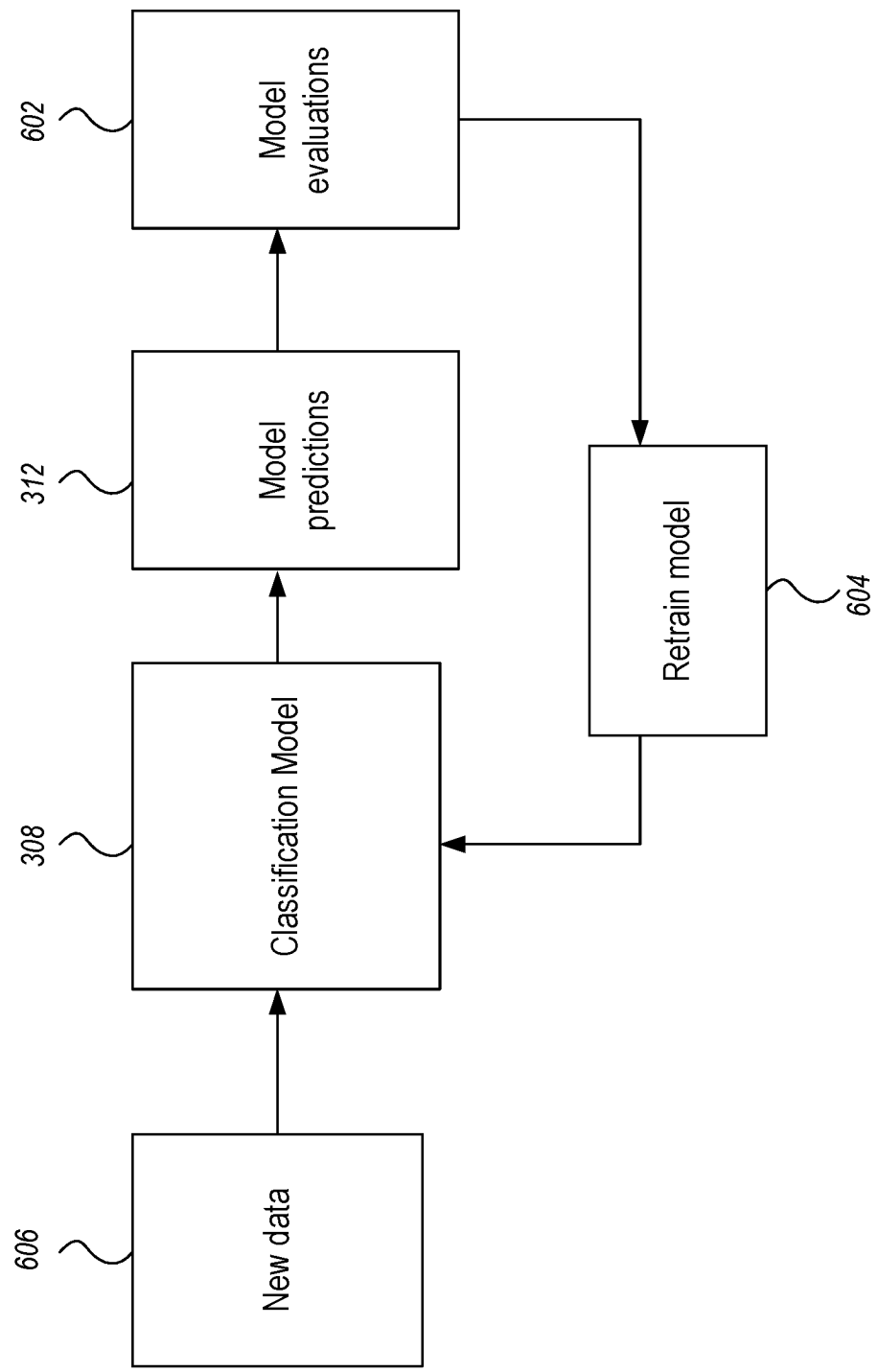
FIG. 6 is a schematic flow diagram showing a method of continuous monitoring of a security incident investigation system.

FIG. 6 shows an example method for evaluating and retraining the model 308 over time. This method may be applied at regular time intervals, for example weekly. New data 606 is received by the classification model 308 containing recent manually-assigned incident characterization labels and comments, for example from the past week. The model 308 is applied as describe above with reference to FIGS. 3 and 4 to generate predicted classification probabilities 312 for each of the incident classification models, and this is compared with the manually-assigned incident characterization labels to determine if a mismatch occurs, with a warning being generated if a mismatch is detected. These predicted classifications are then passed to a model evaluation module 602, which is used to evaluate the model predictions based on the actual manually-assigned incident characterization labels.

Example metrics used to evaluate the model predictions include precision and recall, which can be measured per-class (i.e. for each of the possible incident classification categories). Taking 'benign positive' as an example class, precision for that class is a measure of the fraction of correctly labelled benign positive alerts of a total count of alerts that are labelled as 'benign positive' (correctly or incorrectly). Recall for the same class is the fraction of correctly labelled benign positive alerts of the total number of alerts that are benign positive according to the manually-assigned incident characterization label (whether labelled by the model as benign positive or some other class). For the purposes of evaluating these metrics, the 'ground truth' of each classification is taken as the manually-assigned incident characterization label. As mentioned above, the user comments and classifications may be reviewed to determine whether a poor precision or recall score is indicative of a problem with the model or a problem with the data. Another metric that can be used to evaluate the model is accuracy. An overall accuracy score is the proportion of model predictions that match the corresponding manually-assigned incident characterization labels across all incident classes.

A separate precision, recall and/or accuracy score may be determined for each data source (e.g. each organization), which can then be ranked according to the model score for each organization. Particularly low performance scores for certain organizations may indicate low quality manually-assigned incident characterization labels for that organization, or merely that the model does not reflect the manually-assigned incident characterization labels for that organization, and needs to be re-trained.

The model evaluation module 602 may also carry out performance evaluation by comparing the classification model 308 with a reference model. The reference model is trained on new data (for example, data of weeks 1-3 of the past month) according to the training method described above with reference to FIG. 5. Both models are trained to make incident classification predictions based on user comments. Once the reference model has been trained, the two models can be compared by evaluating them both on data from the final week of the past month. If the reference model performs better on the new data, this indicates that the classification model 308 may need to be retrained or modified in some other way to improve its performance, or even that an entirely new classification model is needed. In this context, and updated incident classification model may result from retraining or otherwise modifying the incident classification model, or from training a new classification model from scratch.

Based on the results of the performance evaluation 602, and/or a review of the manually-assigned incident characterization labels and comments, it may be determined that the model needs to be retrained. In this case, the process according to FIG. 5 is repeated with a new set of manually-assigned incident characterization labels and comments (for example relating to security incident alerts from the past month).

Furthermore, product telemetry may be used to monitor the performance of the classification model 308. This is done by tracking the number of warnings issued based on the model output over time, as well as tracking the number of times the users update the incident classification based on the warnings. If the proportion of warnings being ignored by users increases over time, this could indicate that the quality of the model's predictions has degraded, and retraining of the model as shown in FIG. 6 may be necessary.

The results of the performance evaluations may be recorded and stored to a database for analysis.

As described above, when the model determines that a mismatch occurs, and the SOC 240 raises a warning to the user, the user may decide to update the user incident classification 350, or determine that the model is incorrect and keep the original classification 350. This leads to high accuracy overall by forcing the user to manually re-evaluate all classifications that the model considers to be inconsistent with the corresponding user comments. The updated user comment/classification pairs therefore provide high-quality training data for various downstream tasks, such as training an incident detection model to detect security incidents or a threat remediation model that can take mitigative action in response to a security threat (or potential threat). For example, these pairs could be used to train an automatic incident classification model for implementation by a SOC to reduce the number of security incident alerts to be manually processed by a human security analyst. This data could also be used to train a model to learn to prioritize security incidents to be processed within an SOC, such that security analysts handle incidents that have a high chance of being genuine threats (based on the model's analysis of the user comment) first. This high-quality data can also be used to identify high-risk entities (users, hosts, etc.) by analyzing the classifications and identifying hosts and/or users associated with true positive incidents.

The methods described above therefore improve security incident classification for computer networks, both by improving the quality of security incident analysis carried out on the computer network, while also providing high-quality data for training tools to automatically deal with security incidents.

Figure 7:
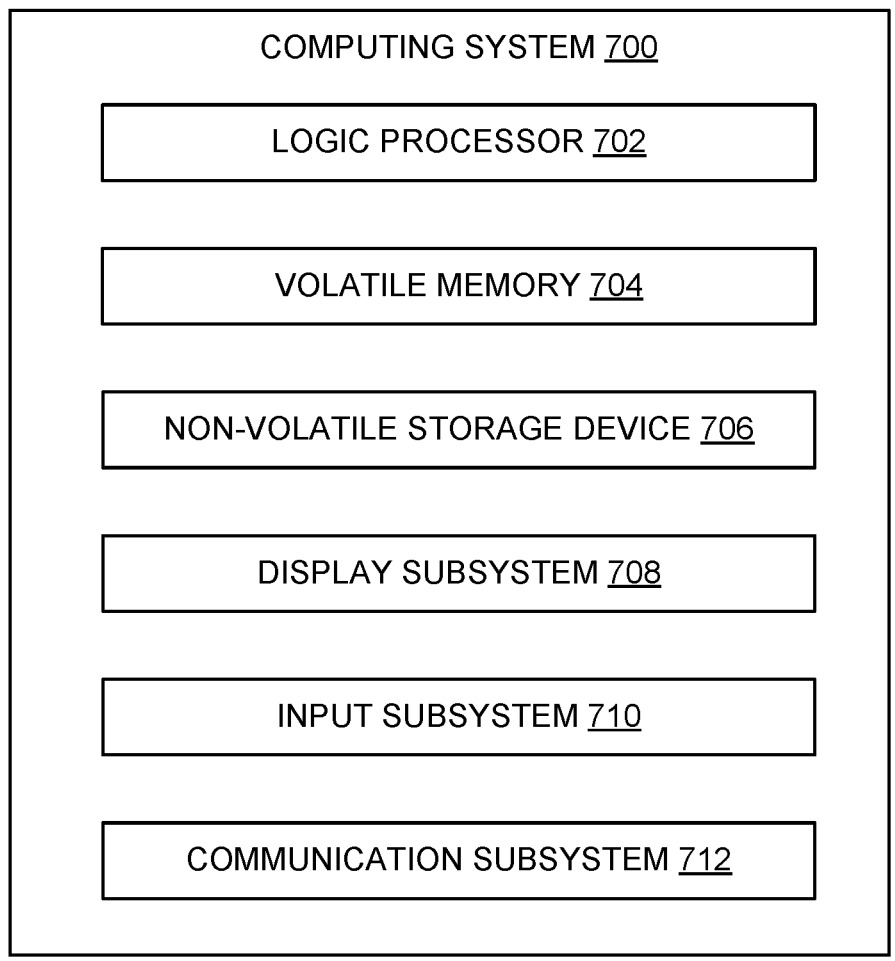
FIG. 7 shows a schematic block diagram of an example computer system.

FIG. 7 schematically shows a non-limiting example of a computing system 700, such as a computing device or system of connected computing devices, that can enact one or more of the methods or processes described above. Computing system 700 is shown in simplified form. Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 7.

Logic processor 702 comprises one or more physical (hardware) processors configured to carry out processing operations. For example, the logic processor 702 may be configured to execute instructions that are part of one or more applications, programs, routines, libraries, objects, components, data structures, or other logical constructs. The logic processor 702 may include one or more hardware processors configured to execute software instructions based on an instruction set architecture, such as a central processing unit (CPU), graphical processing unit (GPU) or other form of accelerator processor. Additionally or alternatively, the logic processor 702 may include a hardware processor (s)) in the form of a logic circuit or firmware device configured to execute hardware-implemented logic (programmable or non-programmable) or firmware instructions. Processor(s) of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 702 may be virtualized and executed by remotely accessible, networked computing devices configured in a cloud-computing configuration. In such a case, these virtualized aspects are run on different physical logic processors of various different machines.

Non-volatile storage device 706 includes one or more physical devices configured to hold instructions executable by the logic processor 702 to implement the methods and processes described herein. When such methods and processes are implemented, the state of non-volatile storage device 706 may be transformed—e.g., to hold different data. Non-volatile storage device 706 may include physical devices that are removable and/or built-in. Non-volatile storage device 706 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 706 may include nonvolatile, dynamic, static, read/write, read-only, sequential-access, location-addressable, file-addressable, and/or content-addressable devices.

Volatile memory 704 may include one or more physical devices that include random access memory. Volatile memory 704 is typically utilized by logic processor 702 to temporarily store information during processing of software instructions.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704.

Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein-described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller.

In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the internet.

The term computer readable media as used herein may include computer storage media. Computer storage media may include volatile and non-volatile, removable and non-removable media (e.g., volatile memory 704 or non-volatile storage 706) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 700 or a component device thereof). Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

Embodiments

A first aspect herein provides a computer-implemented method, the method comprising: receiving an incident description characterizing a security incident; receiving a manually-assigned incident characterization label assigned to the security incident, the manually-assigned incident characterization label corresponding to a first incident classification category of a plurality of incident classification categories; applying a trained incident classification model to the incident description, resulting in a model classification prediction for the security incident in relation to the plurality of incident classification categories; comparing the manually-assigned incident characterization label to the model classification prediction; determining that the manually-assigned incident characterization label and model classification prediction are mismatched; and responsive to determining that the manually-assigned incident characterization label and model classification prediction are mismatched, performing a security mitigation action associated with the security incident.

Performing a security mitigation action may comprise generating a mismatch alert associated with the security incident and/or performing an automatic threat mitigation action associated with the security incident.

The model classification prediction may comprise a score for each incident classification category of the plurality of incident classification categories, the score representative of a predicted probability that the security incident corresponds to the incident classification category.

Each incident classification category may be associated with a predefined threshold, wherein comparing the manually-assigned incident characterization label and the model classification prediction comprises determining whether the score for each incident classification category meets the predefined threshold associated therewith, wherein determining that the manually-assigned incident characterization label and model classification prediction are mismatched comprises determining that the predefined threshold for a second incident classification category of the plurality of incident classification categories, different than the first incident classification category, is met.

The plurality of incident classification categories may comprise a false positive category comprising security incidents that are associated with non-threatening activity, and a true positive category comprising security incidents that are associated with a genuine security threat.

The plurality of incident classification categories may further comprise a benign positive category comprising security incidents that are associated with suspicious activity but do not pose a genuine security threat.

The method may comprise receiving an evaluation data set comprising a plurality of incident descriptions and a plurality of manually-assigned incident characterization labels; applying the trained incident classification model to each incident description of the plurality of incident descriptions, resulting in a plurality of model classification predictions; evaluating the trained incident classification model according to a performance measure, based on the plurality of model classification predictions and the plurality of manually-assigned incident characterization labels; outputting a performance score based on evaluating the trained incident classification model; and based on the performance score, generating an updated incident classification model.

The performance measure may comprise a measure of precision or a measure of recall.

The method may further comprise applying a reference classification model to each of the incident descriptions, resulting in a plurality of reference classification predictions; evaluating the reference classification model according to the performance measure, based on the plurality of reference classification predictions and the plurality of manually-assigned incident characterization labels; outputting a reference performance score based on evaluating the reference classification model; and comparing the performance score to the reference performance score, wherein the updated incident classification model is generated based on comparing the performance score to the reference performance score.

The trained classification model may be evaluated on incident descriptions and manually-assigned incident characterization labels from plurality of data sources, the method comprising: identifying the data source of the plurality of data sources for which the trained incident classification model has the highest performance score, or identifying the data source of the plurality of data sources for which the trained incident classification model has the lowest performance score.

The method may comprise determining that the performance score is below a predefined performance threshold, and re-training the trained incident classification model responsive to determining that the performance score is below the predefined performance threshold, resulting in the updated incident classification model.

Generating the mismatch alert may cause a warning to be output to a user via a user interface, and wherein an updated manually-assigned incident characterization label is received for that security incident via the user interface.

The method may comprise storing the updated manually-assigned incident characterization label and the incident description for the security incident, and training, using the updated manually-assigned incident characterization label and the incident description, an incident detection model or threat remediation model.

The method may be applied to a plurality of incident descriptions and manually-assigned incident characterization labels to generate warnings for a plurality of security incidents, the method further comprising evaluating the trained incident classification model based on a total count of mismatch alerts and/or a proportion of mismatch alerts for which an updated manually-assigned incident characterization label is received.

The incident description may comprise a user comment comprising a natural language description of the security event.

A second aspect herein provides a computer system comprising: at least one memory configured to hold computer-readable instructions; and at least one processor coupled to the at least one memory, the at least one processor being configured to execute the computer-readable instructions which, when executed on the at least one processor, cause the at least one processor to carry out operations comprising: receiving a natural language description characterizing a security incident; receiving a manually-assigned incident characterization label assigned to the security incident; applying a trained incident characterization model to the natural language description, resulting in a predicted incident characterization of the security incident; comparing the manually-assigned incident characterization label to the predicted incident characterization; determining that the manually-assigned incident characterization label and the predicted incident characterization are mismatched; and responsive to determining that the manually-assigned incident characterization label and the predicted incident characterization are mismatched, performing a security mitigation action associated with the security incident.

The manually-assigned incident characterization label may denote a first incident classification category of a plurality of incident classification categories; wherein the predicted incident characterization comprises a score for each incident classification category of the plurality of incident classification categories, the score representative of a predicted probability that the security incident corresponds to the incident classification category.

Each incident classification category may be associated with a predefined threshold, wherein comparing the manually-assigned incident characterization label to the predicted incident characterization comprises determining whether the score for each incident classification category meets the predefined threshold associated therewith, wherein determining that the manually-assigned incident characterization label and the predicted incident characterization are mismatched comprises determining that the predefined threshold for a second incident classification category of the plurality of incident classification categories, different than the first incident classification category, is met.

The plurality of incident classification categories may comprise a false positive category comprising security incidents that are associated with non-threatening activity, and a true positive category comprising security incidents that are associated with a genuine security threat.

A third aspect herein provides computer-readable storage media comprising computer-executable instructions configured so as to, when executed by at least one processor to cause the at least one processor to carry out operations of receiving a plurality of incident descriptions and a plurality of manually-assigned incident characterization labels, each incident description characterizing a security incident and associated with a manually-assigned incident characterization label of the plurality of manually-assigned incident characterization labels that corresponds to a first incident classification category of a plurality of incident classification categories; and training, using the plurality of incident descriptions and the plurality of manually-assigned incident characterization labels, a classification model to generate a model classification prediction based on a runtime incident description.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A computer-implemented method, the method comprising:
   receiving an incident description characterizing a security incident;
   receiving a manually-assigned incident characterization label assigned to the security incident, the manually-assigned incident characterization label corresponding to a first incident classification category of a plurality of incident classification categories, wherein an incident classification category is associated with a predefined threshold;
   applying a trained incident classification model to the incident description, resulting in a model classification prediction for the security incident in relation to the plurality of incident classification categories;
   comparing the manually-assigned incident characterization label to the model classification prediction, wherein the model classification prediction comprises a score for each incident classification category of the plurality of incident classification categories, the score representative of a predicted probability that the security incident corresponds to the incident classification category,
   wherein comparing the manually-assigned incident characterization label and the model classification prediction comprises determining whether the score for the first incident classification category meets a predefined threshold of the first incident classification category;
   wherein determining that the manually-assigned incident characterization label and model classification prediction are mismatched comprises determining that the predefined threshold of the first incident classification category for a second incident classification category of the plurality of incident classification categories, different than the first incident classification category, is met;
   determining that the manually-assigned incident characterization label and model classification prediction are mismatched; and
   responsive to determining that the manually-assigned incident characterization label and model classification prediction are mismatched, performing a security mitigation action associated with the security incident.

2. A method according to claim 1, wherein performing a security mitigation action comprises generating a mismatch alert associated with the security incident and/or performing an automatic threat mitigation action associated with the security incident.

3. A method according to claim 1, wherein the plurality of incident classification categories comprises: a false positive category comprising security incidents that are associated with non-threatening activity.

4. A method according to claim 1, wherein the plurality of incident classification categories comprises: a true positive category comprising security incidents that are associated with a genuine security threat.

5. A method according to claim 1, wherein the plurality of incident classification categories comprises:
   a false positive category comprising security incidents that are associated with non-threatening activity, and
   a true positive category comprising security incidents that are associated with a genuine security threat.

6. A method according to claim 5, wherein the plurality of incident classification categories further comprises a benign positive category comprising security incidents that are associated with suspicious activity but do not pose a genuine security threat.

7. A method according to claim 1, comprising:
   receiving an evaluation data set comprising a plurality of incident descriptions and a plurality of manually-assigned incident characterization labels;
   applying the trained incident classification model to each incident description of the plurality of incident descriptions, resulting in a plurality of model classification predictions;
   evaluating the trained incident classification model according to a performance measure, based on the plurality of model classification predictions and the plurality of manually-assigned incident characterization labels;
   outputting a performance score based on evaluating the trained incident classification model; and
   based on the performance score, generating an updated incident classification model.

8. A method according to claim 7, wherein the performance measure comprises a measure of precision or a measure of recall.

9. A method according to claim 7, further comprising:
applying a reference classification model to each of the incident descriptions, resulting in a plurality of reference classification predictions;
evaluating the reference classification model according to the performance measure, based on the plurality of reference classification predictions and the plurality of manually-assigned incident characterization labels;
outputting a reference performance score based on evaluating the reference classification model; and
comparing the performance score to the reference performance score, wherein the updated incident classification model is generated based on comparing the performance score to the reference performance score.

10. A method according to claim 7, wherein the trained classification model is evaluated on incident descriptions and manually-assigned incident characterization labels from plurality of data sources, the method comprising:
identifying the data source of the plurality of data sources for which the trained incident classification model has the highest performance score, or
identifying the data source of the plurality of data sources for which the trained incident classification model has the lowest performance score.

11. A method according to claim 7, comprising:
determining that the performance score is below a predefined performance threshold, and
re-training the trained incident classification model responsive to determining that the performance score is below the predefined performance threshold, resulting in the updated incident classification model.

12. A method according to claim 2, wherein generating the mismatch alert causes a warning to be output to a user via a user interface, and wherein an updated manually-assigned incident characterization label is received for that security incident via the user interface.

13. A method according to claim 12 comprising storing the updated manually-assigned incident characterization label and the incident description for the security incident, and
training, using the updated manually-assigned incident characterization label and the incident description, an incident detection model or threat remediation model.

14. A method according to claim 12, applied to a plurality of incident descriptions and manually-assigned incident characterization labels to generate warnings for a plurality of security incidents, the method further comprising evaluating the trained incident classification model based on a total count of mismatch alerts and/or a proportion of mismatch alerts for which an updated manually-assigned incident characterization label is received.

15. A method according to claim 1, wherein the incident description comprises a user comment comprising a natural language description of the security event.

16. A computer system comprising:
at least one memory configured to hold computer-readable instructions; and
at least one processor coupled to the at least one memory, the at least one processor being configured to execute the computer-readable instructions which, when executed on the at least one processor, cause the at least one processor to carry out operations comprising:
receiving a natural language description characterizing a security incident;
receiving a manually-assigned incident characterization label assigned to the security incident;
applying a trained incident characterization model to the natural language description, resulting in a predicted incident characterization of the security incident;
comparing the manually-assigned incident characterization label to the predicted incident characterization, wherein comparing the manually-assigned incident characterization label and the model classification prediction comprises determining whether the score for the first incident classification category meets a predefined threshold of the first incident classification category;
determining that the manually-assigned incident characterization label and the predicted incident characterization are mismatched; and
responsive to determining that the manually-assigned incident characterization label and the predicted incident characterization are mismatched, performing a security mitigation action associated with the security incident.

17. A computer system according to claim 16, wherein the manually-assigned incident characterization label denotes a first incident classification category of a plurality of incident classification categories;
wherein the predicted incident characterization comprises a score for each incident classification category of the plurality of incident classification categories, the score representative of a predicted probability that the security incident corresponds to the incident classification category.

18. A computer system according to claim 17, wherein each incident classification category is associated with a predefined threshold,
wherein comparing the manually-assigned incident characterization label to the predicted incident characterization comprises determining whether the score for each incident classification category meets the predefined threshold associated therewith,
wherein determining that the manually-assigned incident characterization label and the predicted incident characterization are mismatched comprises determining that the predefined threshold for a second incident classification category of the plurality of incident classification categories, different than the first incident classification category, is met.

19. A computer system according to claim 17, wherein the plurality of incident classification categories comprises:
a false positive category comprising security incidents that are associated with non-threatening activity, and
a true positive category comprising security incidents that are associated with a genuine security threat.

20. A computer-readable storage media comprising computer-executable instructions configured so as to, when executed by at least one processor to cause the at least one processor to carry out operations of:
receiving a plurality of incident descriptions and a plurality of manually-assigned incident characterization labels, each incident description characterizing a security incident and associated with a manually-assigned incident characterization label of the plurality of manually-assigned incident characterization labels that corresponds to a first incident classification category of a plurality of incident classification categories; and
training, using the plurality of incident descriptions and the plurality of manually-assigned incident characterization labels, a classification model to generate a model classification prediction based on a runtime incident description, wherein model classification prediction comprises determining whether the score for the first incident classification category meets a predefined threshold of the first incident classification category.

* * * * *